United States Patent [19]

Davis

[11] Patent Number: 4,739,576
[45] Date of Patent: Apr. 26, 1988

[54] DEEP-DIVING FISHING LURE

[76] Inventor: Jack Davis, Star Rt.2, Box 475, Crescent City, Fla. 32012

[21] Appl. No.: 907,105

[22] Filed: Sep. 15, 1986

[51] Int. Cl.$^4$ ............................................. A01K 85/00
[52] U.S. Cl. .................................................. 43/42.47
[58] Field of Search ................. 43/42.47, 42.22, 43.13, 43/42.45, 42.48, 42.49

[56] References Cited

U.S. PATENT DOCUMENTS

| D. 218,932 | 10/1970 | Perrin | 43/42.47 |
|---|---|---|---|
| 2,245,061 | 6/1941 | Wisniewski | 43/42.49 |
| 2,499,718 | 3/1950 | Boshears | 43/42.47 |
| 2,503,620 | 4/1950 | Larson | 43/42.35 |
| 2,518,213 | 8/1950 | Wood | 43/42.47 |
| 2,542,447 | 2/1951 | Adam et al. | 43/42.47 |
| 2,694,876 | 11/1954 | Grasser | 43/42.47 |
| 2,945,318 | 7/1960 | Lassiter | 43/42.47 |
| 3,462,871 | 8/1969 | McVay | 43/42.47 |
| 4,215,507 | 8/1980 | Russell | 43/42.22 |
| 4,445,294 | 5/1984 | Gowing | 43/42.47 |

Primary Examiner—Gene P. Crosby
Attorney, Agent, or Firm—Jones, Askew & Lunsford

[57] ABSTRACT

A diving lure or crankbait capable of reaching increased diving depths. The lure includes a diving plate or lip extending forwardly from the front end of the lure body. A forward portion of the lip is upwardly angled in relation to a rearward portion thereof, producing an increased flow of water over the upper surface when the lure is cranked. This increased water flow produces a downward pressure on the lip in front of the pull point, increasing the diving angle and significantly increasing the maximum depth obtainable by the lure.

15 Claims, 3 Drawing Sheets

DEEP-DIVING FISHING LURE

FIELD OF INVENTION

This invention relates in general to fishing lures, and relates in particular to a crankbait capable of diving to increased depths.

BACKGROUND OF THE INVENTION

For catching fish which normally don't strike bait floating on the surface, or which usually remain well below the surface, fishermen use lures designed to dive beneath the surface. This category of fishing lure typically is buoyant and is designed to dive below the surface where the lure is pulled or trolled through the water. For example, a fisherman first casts out a diving lure, and then pulls in the lure by pulling up or "cranking" the tip of the fishing rod. The forward motion of the diving lure through the water generates a downward force on the lure, moving the lure down beneath the surface as the lure is pulled forwardly. The fisherman then lowers the tip of the rod and winds in the slack line, and then again cranks up the tip of the rod, further increasing the diving depth of the lure. Lures designed for fishing in this manner are called "crankbaits".

Crankbaits known in the prior art usually have a solid lure body supporting one or more fish hooks, with a diving plate extending forwardly from the front end of the lure body. These diving plates, sometimes called lips or bills, are angled downwardly relative to the lure body and water flowing over the diving plate exerts a downward diving force on the lure body as the lure is pulled or cranked forwardly through the water.

A crankbait, to be effective, should be capable of diving to desired fishing depths, preferably on the order of 20 feet or more. Moreover, the crankbait should be capable of diving to its greatest depth quickly, and without having to be fast-cranked through the water. Fast-cranking the lure brings the bait back to the angler far too quickly, and doesn't keep the lure in the effective fishing strike zone long enough to do much good. Prior art diving lures tried to accomplish these results with diving plates extending at a relatively large downward angle between the plate and the longitudinal axis of the lure body. The conventional wisdom was that the steeper the diving plate angled downwardly, the greater the diving depth resulting from each pull of the lure through the water. Other crankbait lure designs of the art include diving plates adjustably connected to the lure body, ostensibly to fine-tune the diving operation by modifying the overall effective length of the diving plate. One such lure is shown in U.S. Pat. No. 4,215,507. Other examples of prior-art diving lures are shown in U.S. Pat. Nos. 2,518,213; 2,542,447; 3,462,871; and 4,445,294.

Prior-art diving lures have a maximum diving depth bottoming out at about nine feet, despite extensive efforts to design lures exceeding that diving depth without fast-cranking the lure. This depth limitation of existing crankbaits greatly limits the effectiveness of the lure in a variety of fishing conditions. Where the water being fished is considerably deeper, e.g., 20-30 feet, than the maximum diving depth of existing crankbaits, many fish remain several feet below that maximum diving depth and those fish will not rise in the water to strike the lure. Moreover, modern injection-molded plastic crankbaits lack the natural counterweight effect of the metal-lipped crankbaits popular in the prior art. Crankbaits capable of diving beneath about nine feet were considered unusual, and the 20-foot diving depth was considered an absolute barrier for diving lures.

SUMMARY OF THE INVENTION

Stated in general terms, deep diving lures according to the present invention include a lip or diving plate configured to increase the amount of water flowing over the front end of the lip and onto the upper surface of the lip. This increased water flow provides a downward force on the lip in front of the pull point, that is, the point of attachment to the fishing line, so that the downward force of water flowing over the lip causes a steeper diving angle each time the lure is pulled or cranked.

Stated somewhat more specifically, the lip or diving plane has an upper surface with a rear portion extending forwardly from the lure body. This rear portion of the upper surface preferably has a relatively shallow angle of depression in relation to the body of the lure. An eyelet or the like is formed in the upper surface of the lip, preferably as near to the surface of the lip as possible, providing an attachment point for the fishing line. The front portion of the lip is angled upwardly from the downwardly-angled rear portion, commencing forwardly of the pull point. The front end of the lip is thicker than the rear portion thereof, due to the upward angle of the front portion, and the enlarged area of this forward end creates a dam which helps spill water up onto the top of the upwardly-angled lip as the lure is pulled through the water. This effect further increases the force exerted downwardly against the lip in front of the pull point, increasing the dive angle of the lure and thereby increasing the maximum diving depth of the lure for a given amount of forward pull.

Stated with somewhat greater detail, the lateral width of the lip on the present lure is relatively narrow where the lip joins the body of the lure. This narrowness preferably is less than the maximum width of the lure body behind the front end of the lure, producing a wasp-waist shape at the junction of the lure body and the diving lip. This wasp-waist shape allows the increased water flow along the upper surface of the lip to flow off the lip before reaching the lure body, reducing turbulence acting on the lure body and thereby reducing wobble or roll as the lure is pulled through the water.

Accordingly, it is an object of the present invention to provide an improved deep-diving fishing lure.

It is another object of the present invention to provide a crankbait capable of diving to greater depths than heretofore attainable.

It is a further object of the present invention to provide an improved diving lure which reaches its maximum depth without being fast-cranked to that depth.

It is yet another object of the present invention to provide an improved crankbait in which the lure body and diving lip can be fabricated from integral molded elements.

Other objects and advantages of the present invention will become more readily apparent from the following description of a preferred embodiment.

DESCRIPTION OF PREFERRED EMBODIMENT

Figure 1:
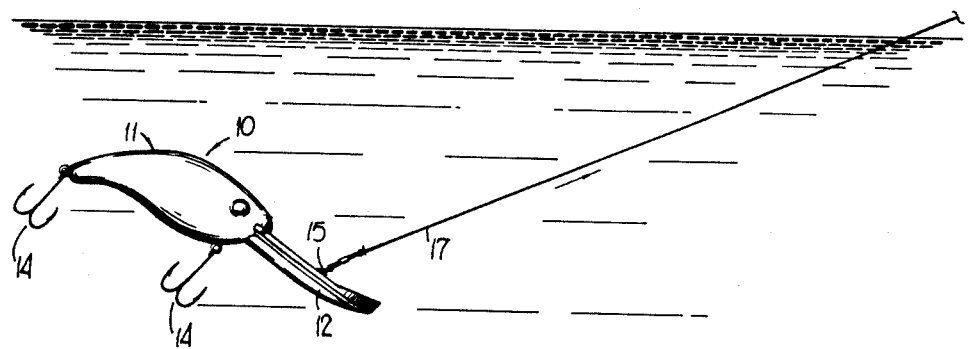
FIG. 1 is a side elevation view of a diving lure according to a preferred embodiment of the present invention.
Figure 2:
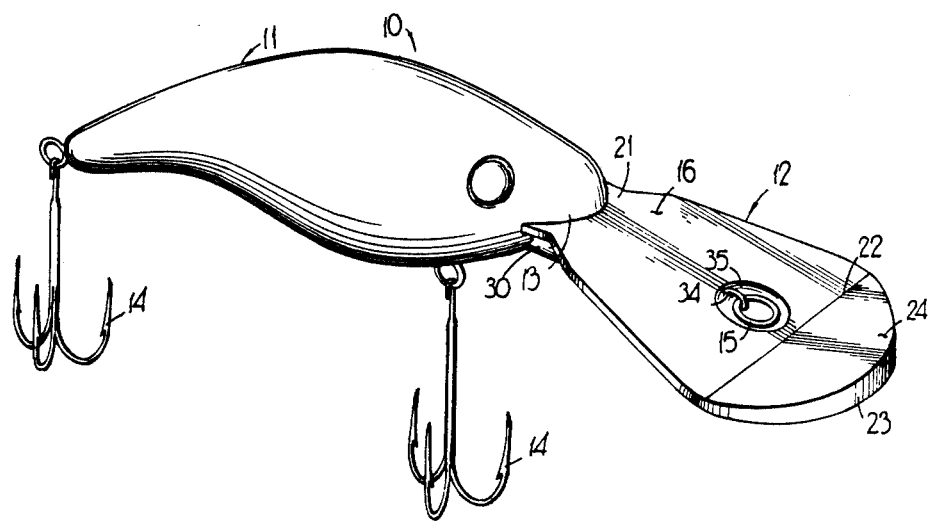
FIG. 2 is an enlarged isometric view of the lure shown in FIG. 1.

Turning first to FIGS. 1 and 2, there is shown generally at 10 a deep diving lure having a lure body 11 and a diving plate or lip 12 extending out from the front end 13 of the body. A pair of conventional fish hooks 14 are attached to the lure body 11. An eyelet 15 is mounted on the upper surface 16 of the lip 12, for attaching a fishing line 17 to the lure 10.

Figure 3:
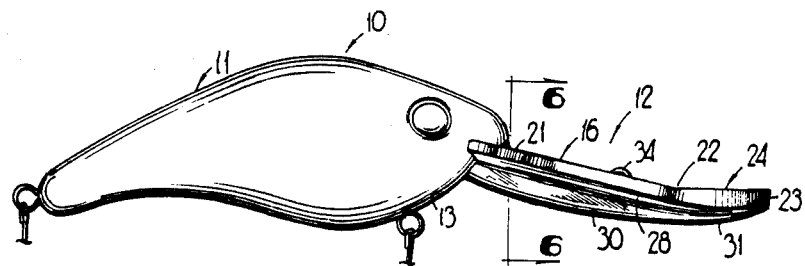
FIG. 3 is a side elevation view of the lure shown in FIG. 1.

Referring next to FIG. 3, the upper surface 16 of the lip 12 has a relatively shallow downward angle relative to the longitudinal extent of the lure body 11. This downwardly-angled upper surface of the lip extends from the back end 21 of the lip, forwardly to an intermediate location 22 along the length of the lip. Extending forwardly from the intermediate location 22 to the front end 23 of the lip 12, the upper surface of the lip is angled upwardly as seen at 24. The upwardly-angled surface 24 and the downwardly angled surface 16 of the lip 12 intersect each other along a line extending laterally across the width of the lip, this line of intersection comprising the intermediate location 22 previously mentioned. This intermediate location 22 is located in front of the eyelet 15, which establishes the pull point for the lure 10.

The thickness of the lip 12, as measured between the top surface 16 and the underside 28 of the lip, is substantially uniform from the back end 21 to the intermediate location 22 of the lip. The underside 28 continues forwardly beyond the intermediate location 22 to the front end 23 of the lip without interruption. Because the upward forward surface 24 of the lip 12 is angled upwardly, however, the thickness of the lip increases forwardly from the intermediate location 22. This increasing thickness of the lip 12 provides a blunt front end 23 which is of enlarged frontal area relative to the portion of the lip behind the intermediate location 22. The purpose of this enlarged front end 23, and of the upwardly-angled forward surface 24, is explained below.

Figure 5:
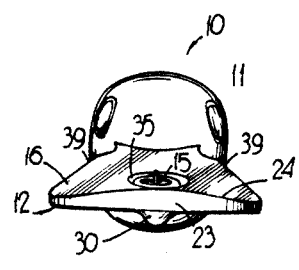
FIG. 5 is a front elevation view of the lure shown in FIG. 1.
Figure 6:
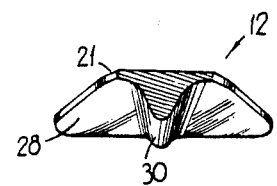
FIG. 6 is a section view taken along line 6—6 of FIG. 3.
Figure 7:
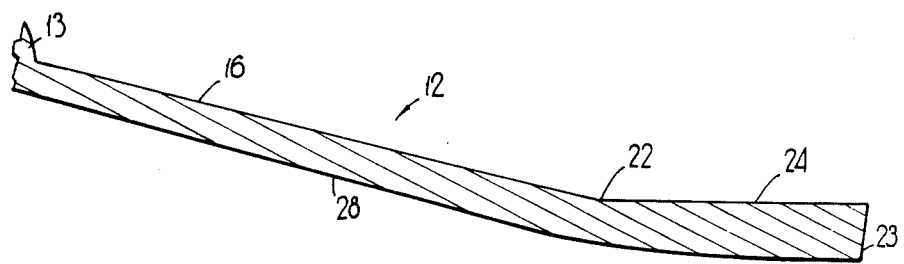
FIG. 7 is a partial longitudinal section view taken along line 7—7 of FIG. 4.
Figure 8:
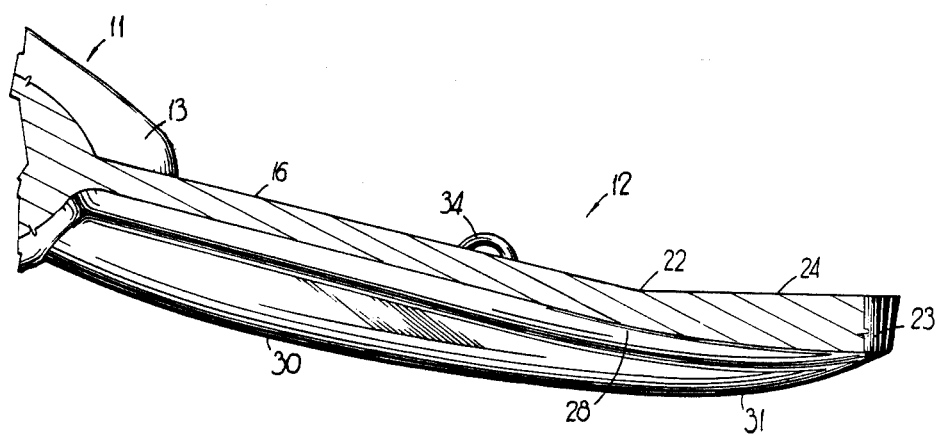
FIG. 8 is a partial longitudinal section view taken along line 8—8 of FIG. 4.

A longitudinal centerline fin 30 protrudes downwardly from the underside 28 of the lip 12, as best seen in FIGS. 3 and 5. This fin 30 extends virtually the entire length of the lip 12 in the disclosed embodiment, with the downwardly extent of the fin tapering up toward the front end 23 of the lip as best seen at 31 in FIGS. 3 and 8. The tapered forward end 31 of the fin 30 helps prevent the lure from becoming stuck on rocks or other bottom structure. The longitudinal fin 30 provides lateral stability as the lure is pulled through the water, preventing unwanted wobbling action and thus helping maintain the desired flow of water over the top surfaces of the lip 12.

The eyelet 15 preferably is located to provide a pull point as near to the top surface 16 of the lip 12 as possible. To that end, the eyelet 15 is pivotably secured to a eyelet mount 34 anchored within the fin 30, as seen in FIG. 3. The upper end of the eyelet mount 34 lies within a shallow recess 34 formed in the top surfaces 15 of the lip 12, and the eyelet 15 at rest preferably fits within the recess. The location of the eyelet mount 34 within the recess 35 enables the eyelet to contact the eyelet mount at a point approximately flush with the top surface 16 of the lip 12, when the lure 10 is being pulled or cranked as illustrated in FIG. 1. This arrangement of the eyelet and eyelet mount thus places the pull point of the lure substantially on the upper surface 16 of the lip 12.

The operation of the lure 10 is now described. The angler casts the lure and then cranks it in the usual manner, pulling the lure forwardly through the water. Because the top surface 16 of the lip 12 has a slight downward angle relative to the lure body, the movement of the top surface through the water initially pulls the lure downwardly beneath the surface, as is conventional with any crankbait. However, once the lure 10 becomes submerged, forward movement of the lure produces an increased flow of water over the front end 23 and downwardly along the upwardly-angled forward surface 24 of the lip onto the upper surface 156 of the lip. This flow of water impinges on the upper surface of the lip in front of the eyelet 15, and thus creates a downward force component acting on the lip in front of the pull point. This downward force acting on the lip 12 in front of the pull point increases the diving angle of the lure each time the angler cranks the fishing line 17, producing a significantly-greater diving effect for each forward pull or crank than heretofore obtainable with conventional crankbaits.

The relatively enlarged frontal area or dam at the front end 23 of the lip 12, as previously mentioned, further increases the flow of water over the front end and thus augments the downwardly-directed force increasing the diving angle of the lure.

Figure 4:
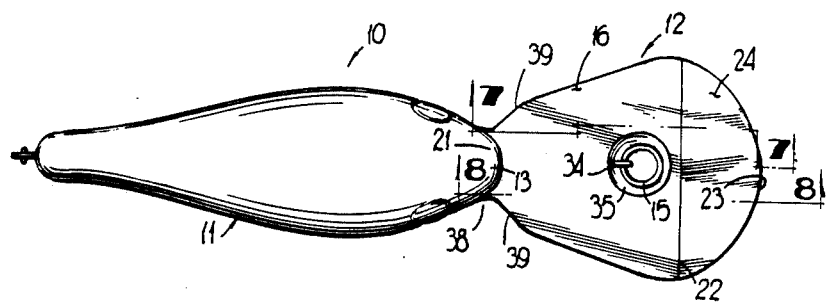
FIG. 4 is a top plan view of the lure shown in FIG. 1.

The lateral width of the lip 12 is narrowest at its back end 21, as best seen in FIG. 4, where the lip 12 joins the front end 13 of the lure body 11. This narrowing of the lip back end produces a necked or "wasp-waist" configuration 38 where the lip 12 joins the body. This waspwaist configuration allows the water flowing along the upper surface of the lip 12 to slip off the lip on the relatively narrow rearwardly-extending edges 39 of the lip before the water flow reaches the lure body 11, so that relatively little of the enhanced water flow can act on the front end 13 of the lure body and cause the lure body to roll or wobble in the water. Wobbling or similar movement of the lure body is undesirable during cranking of the lure, because wobble of the body allows the lip 12 to turn up on its edges, causing water to slip off the lip and thereby diminishing the effect of water pressure that increases the dive angle and drives the lure more deeply than attainable heretofore.

It should now be apparent from the foregoing that diving lures according to the present invention have significantly-increased diving characteristics. Actual embodiments of lures made according to this invention have reached depths of at least 20 feet without being fast-cranked. The relatively shallow downward angle of the top surface 16 on the front portion of the lip gives the lure improved stability and running characteristics, once the lure is cranked to the desired depth. The upwardly-angled forward surface 24 and the enlarged frontal area of the lip significantly enhance the diving angle as the lure is cranked through the water. The relatively narrowed wasp-waist at the back end of the lip 12, where the lip joins the lure body 11, shed much of the water flowing along the top surface of the lip and thus minimizes rolling or wobbling of the lure body. The present design also facilitates the manufacture of molded crankbaits, where the lure is formed of two injection-molded halves joined together along the longitudinal center line of the lure. The body 11 and lip 12 thus are integral with each molded half of the lure, providing a more economical fabrication and improved quality of the finished lure.

It will be understood that the foregoing relates only to a preferred embodiment of the present invention, and that numerous changes and modifications thereto can be made without departing from the spirit or scope of the invention as set forth in the following claims.

I claim:

1. A deep-diving fishing lure comprising:
an elongate lure body having a longitudinal axis;
a diving plane extending from said lure body to terminate at a forward end;
said diving plane having an upper surface with a rear portion angled downwardly at a relatively shallow angle of depression in relation to the longitudinal axis of said lure body;
pull means on said diving plane substantially flush with said rear portion of the upper surface, for attaching a fishing line to the fishing lure;
said diving plane having a forward surface in front of said pull means and angled upwardly relative to said rear portion to increase water flow over the forward end and upper surface of the diving plane; and
the frontal area of said forward end of the diving plane being enlarged in thickness relative to the rear portion, so that said enlarged forward end provides a dam operating to increase water flow over said forward surface to act on the upper surface,
whereby the increased water flow impinges on the upper surface of the diving plane in front of the pull means so as to increase the force acting downwardly on the diving plane in front of said pull means and thereby increase the diving angle as the lure is pulled through the water.

2. A lure as in claim 1, wherein:
said pull means is spaced a distance in front of the lure body and behind the forward surface of the diving plane.

3. A deep-diving fishing lure comprising:
a lure body having a front portion;
a lip having a back end joining the front portion of said lure body and having an upper surface extending forwardly to the front end of the lip;
the thickness of said lip being substantially uniform from said back end forwardly to an intermediate location on the lip, and increasing from said intermediate location forwardly to said front end, whereby the front end is enlarged in relation to rearward portions of the lip,
so that the enlarged front end enhances water flow over the front end and onto the upper surface of said lip as the lure moves forwardly through water, thereby forcing downwardly the front end of the lure and increasing the diving depth of the lure in response to said forward movement.

4. A deep-diving fishing lure comprising:
a lure body;
a diving lip having a back end and extending forwardly from said lure body, said diving lip having an upper surface and a lower surface;
pull means on said upper surface of the diving lip for attaching a fishing line to the lure; and
the frontal area at the forward end of said lip being enlarged in thickness relative to the back end to comprise a dam at the forward end to divert water flow over the forward end and onto said upper surface of the lip in front of said pull means, in response to forward motion of the lure through the water,
so that the force of the diverted water flow increases the diving angle and thereby the maximum diving depth of the lure in response to said forward motion.

5. The lure as in claim 4, wherein:
said dam at the forward end of the lip diverts said water flow to produce a flow component directed downwardly onto the upper surface of the lip.

6. The lure as in claim 4, further comprising:
a fin protruding from said lower surface of the lip and extending longitudinally along a path between the lure body and the forward end of the lip,
whereby said fin laterally stabilizes the movement of the lure through the water.

7. The lure as in claim 4, wherein said lure is buoyant in water.

8. The lure as in claim 4, wherein
the lateral width of said lip increases from said forward end to a maximum width at a point intermediate the length of the lip from the forward end to said lure body, and thereafter decreases to a narrowest extent at the back of the lip adjoining the lure body,
so that the diverted water spills off the relatively narrow back end of the lip without flowing over the forward end of the lure body, after flowing over said upper surface of the lip and increasing the diving angle of the lure.

9. A deep-diving fishing lure comprising:
a lure body;
a diving lip extending forwardly from said lure body and having an upper surface and a lower surface;
pull means on said upper surface of the diving lip for attaching a fishing line to the lure;
means at the forward end of said lip to divert water flow over the forward end and onto said upper surface of the lip in front of said pull means to forward motion of the lure through the water; and
said means at the forward end of the lip comprising a region of enlarged thickness at the forward end of said lip whereby the force of the diverted water flow increases the diving angle and thereby the maximum diving depth of the lure in response to said forward motion.

10. A deep-diving fishing lure comprising:
an elongate lure body having a longitudinal axis;
a diving plane extending from said lure body to terminate at a forward end;
said diving plane having an upper surface with a rear portion angled downwardly at a relatively shallow angle of depression in relation to the longitudinal axis of said lure body;

pull means on said diving plane for attaching a fishing line to the fishing lure;

said diving plane having a forward surface of enlarged thickness in front of said pull means and angled upwardly relative to said rear portion to increase water flow over the forward end and upper surface of the diving plane, whereby the increased water flow impinges on the upper surface of the diving plane in front of the pull point so as to increase the force acting downwardly on the diving plane in front of said pull means and thereby increase the diving angle as the lure is pulled through the water.

11. A deep-diving fishing lure comprising:

an elongate lure body having a longitudinal axis;

a diving plane extending from said lure body to terminate at a forward end;

said diving plane having an upper surface with a rear portion angled downwardly at a relatively shallow angle of depression in relation to the longitudinal axis of said lure body;

pull means on said diving plane for attaching a fishing line to the fishing lure;

said diving plane having a forward surface in front of said pull means and angled upwardly relative to said rear portion; and thickness means associated with the forward end of said forward surface to increase water flow over the forward end and onto the upper surface of the diving plane, whereby the increased water flow impinges on the upper surface of the diving plane at a region in front of the pull point so as to increase the force acting downwardly on the diving plane in front of said pull means and thereby increase the diving angle as the lure is pulled through the water.

12. The lure as in claim 11, further comprising:

a shallow recess formed in the upper surface at the rear portion of said diving plane; and said pull means is secured to the diving plane within said recess so as to impart the pull of the fishing line to the diving plane at a location no higher than substantially flush with the upper surface in which the recess is formed, thereby increasing the diving angle as the lure is pulled through the water.

13. The lure as in claim 12, wherein the shallow recess is located in the upper surface immediately behind the region of impingement of the water flow.

14. The lure as in claim 11, further comprising:

a shallow recess formed in the upper surface at the rear portion of said diving plane; and said pull means is secured to the diving plane within said recess so as to impart the pull of the fishing lure to the diving plane at a location within the recess and thus shallowly below the upper surface in which the recess is formed, thereby increasing the diving angle as the lure is pulled through the water.

15. The lure as in claim 14, wherein the shallow recess is located in the upper surface immediately behind the region of impingement of the water flow.

* * * * *